United States Patent [19]
Yoshimura

[11] Patent Number: 5,108,490
[45] Date of Patent: Apr. 28, 1992

[54] METHOD OF REFINING HIGH PURITY TITANIUM

[75] Inventor: Yasunori Yoshimura, Ashiyagawa, Japan

[73] Assignee: Osaka Titanium Co., Ltd., Hyogo, Japan

[21] Appl. No.: 643,224

[22] Filed: Jan. 22, 1991

[30] Foreign Application Priority Data

Jan. 19, 1990 [JP] Japan ................................. 2-11089

[51] Int. Cl.$^5$ ............................................. C22B 4/00
[52] U.S. Cl. ............................................. 75/10.28
[58] Field of Search ................................... 75/10.28

[56] References Cited

U.S. PATENT DOCUMENTS 2,895,852 7/1959 Loonam .............................. 75/10.28
3,004,848 10/1961 Hansley .............................. 75/10.28

Primary Examiner—Peter D. Rosenberg
Attorney, Agent, or Firm—Oblon, Spivak, McClelland, Maier & Neustadt

[57] ABSTRACT

A method of refining high purity titanium, which comprises reacting crude titanium with titanium tetraiodide in a reactor, thereby forming lower valent titanium iodides, and thermally decomposing the formed lower valent titanium iodides, and depositing high purity titanium.

9 Claims, 2 Drawing Sheets

METHOD OF REFINING HIGH PURITY TITANIUM

BACKGROUND OF THE INVENTION

1. Field of the Invention

The present invention relates to a method of refining high purity titanium.

2. Description of the Background

With the rapidly increasing degree of integration of LSI in recent years, the electrode materials used for LSI must, necessarily, have higher purity and strength. For example, it is now necessary to rescue the delay of signal transmission due to finer electrode wiring and metal materials are now in use having lower resistances, higher purities and higher melting points than polysilicon which was used previously.

High purity and high melting point metal materials which are used as LSI electrodes are molybdenum, tungsten and titanium or their silicides, for example. Titanium is particularly desirable due to its excellent specific strength, workability and corrosion resistance.

However for titanium to be used as an electrode material for semiconductors, a high purity is indispensable. As a refining method for obtaining high purity titanium, the iodization process is conventionally used. A conventional refining method of high purity titanium by iodization will now be described in conjunction with FIG. 2.

A reactor 1 is housed in an electric furnace 2, with a filament 3 inserted at its axial center. Inside the reactor 1, crude titanium 4 is held, surrounding the filament 3. As iodine in an iodine container 6 is led into the reactor 1, while heating the filament 3 by supplying power from a source 5, after evacuating the inside of the reactor 1, the following reactions will take place in the hermetically closed reactor 1:

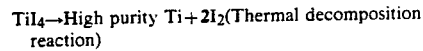

The synthetic reaction of crude titanium with iodine proceeds inside the reactor in which the crude titanium is held on its perimeter, with the reaction temperature at 200°–400° C. The thermal decomposition reaction of the tetraiodide obtained by the synthesis of crude titanium and iodine proceeds on the filament at the axial center of the reactor, with the reaction temperature at 1,300°–1,500° C. The iodine produced as a byproduct by the thermal decomposition of titanium tetraiodide diffuses inside the reactor to its perimeter, to be cyclically used for the synthetic reaction of crude titanium with iodine. Thus with regard to the above-mentioned reactions, deposition of high purity titanium is continued, with the perimeter inside the reactor providing the low temperature zone, and its axial center the high temperature zone.

Unfortunately, the above-described process is attended by three serious drawbacks, each of which will now be discussed.

First, since titanium tetraiodide is used as the reactant gas for the thermal decomposition reaction which proceeds on the filament located at the axial center of the reactor, the reaction temperature is extremely high, i.e., 1,300°–1,500° C. At such a high temperature, there is the possibility that any metal impurities contained in the reactant gas might undergo thermal decomposition, for them to be mixed into the deposited titanium. This prevents the attainment of a higher purity for the deposited titanium.

Second, since the synthetic reaction of titanium tetraiodide proceeds inside the reactor on the perimeter thereof at the relatively low temperature of 200°–400° C., for example, the high m.p. lower valent titanium iodides ($TiI_2$ and $TiI_3$) tend to form as byproducts in the solid state. The lower valent titanium iodides which have formed in the solid state coat the crude titanium surface, impeding the synthetic reaction, thus hindering the continuation of the reactions.

Third, as the reaction proceeds inside of the reactor, the metal impurities in the crude titanium are concentrated on the crude titanium surface or in the iodide gases. On this account, the purity of the deposited titanium gradually decreases with the progress of the reaction.

Thus, a need continues to exist for a method of refining high purity titanium whereby the formation of solid byproducts is suppressed, while preventing the contamination of gases inside the reactor by the metal impurities in the crude titanium and inhibiting thermal decomposition of metal impurities by lowering the thermal decomposition temperature for titanium decomposition.

SUMMARY OF THE INVENTION

Accordingly, it is an object of the present invention to provide a method of refining high purity titanium, which suppresses the formation of solid byproducts.

It is also an object of this invention to provide a method to prevent contamination of gases inside the reactor by metal impurities in the crude titanium.

It is further an object of the present invention to provide a method of refining high purity titanium which inhibits thermal decomposition of metal impurities.

In particular, the above objects and other are provided by a method of refining high purity titanium, which entails:

a) reacting crude titanium with titanium tetraiodide in a reactor, thereby forming lower valent titanium iodides, and b) thermally decomposing the formed lower valent titanium iodides, and depositing high purity titanium.

DETAILED DESCRIPTION OF THE PREFERRED EMBODIMENT

The present invention provides a method of refining high purity titanium which entails reacting crude titanium in a reactor with titanium tetraiodide, thereby synthesizing lower valent titanium iodides, and decomposing the lower valent titanium iodides, to deposit high purity titanium.

The lower valent titanium iodides, i.e., $TiI_2$ and $TiI_3$, afford higher synthetic reaction temperatures and lower thermal decomposition temperatures, as compared with titanium tetraiodide. In the refining method of the present invention, in order to make practical use of this low decomposition temperature, once the lower valent titanium iodides are synthesized by reacting titanium tetraiodide with crude titanium, then, with these lower valent titanium iodides as intermediates, high purity titanium is obtained.

While the reaction mechanisms for the synthesis and decomposition of the lower valent titanium iodides are rather indistinct, in the reactor, such reactions are represented by the following equations:

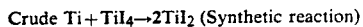

Crude Ti + TiI$_4$ → 2TiI$_2$ (Synthetic reaction)

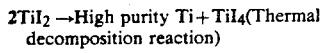

2TiI$_2$ → High purity Ti + TiI$_4$ (Thermal decomposition reaction)

The synthesis of the lower valent titanium iodides by the reaction of crude titanium with titanium tetraiodide is performed at about 700°–900° C., i.e., temperatures higher than that for the synthesis of titanium tetraiodide, directly yielding the lower valent titanium iodides in gas state. At the synthesizing temperatures of the lower valent titanium iodides, the unreacted titanium tetraiodide and the one formed by the thermal decomposition are kept in gas state. Accordingly, there is no possibility that the iodide gases (lower valent titanium iodides and titanium tetraiodide) inside the reactor might coat the crude titanium surface; thus, state continuation of the synthetic reaction is assured.

The lower valent titanium iodides more readily undergo thermal decomposition than titanium tetraiodide, thus allowing the thermal decomposition temperature to be lowered to about 1,100°–1,300° C. Accordingly, the thermal decomposition of the metal impurities contained in the lower valent titanium iodides used as the gas source for depositing titanium is thwarted, thereby eliminating the possibility that any metal impurities might be mixed into the deposited titanium.

Further, as the titanium iodides (titanium tetraiodide and lower valent titanium iodides) are discharged out of the reactor, while feeding titanium tetraiodide into the reactor during the aforementioned reaction, the metal impurities released into the titanium iodides from the crude titanium are successively discharged out of the reactor, thereby foreclosing the possibility that metal impurities might be concentrated into the titanium iodide gases in the reactor.

Figure 1:
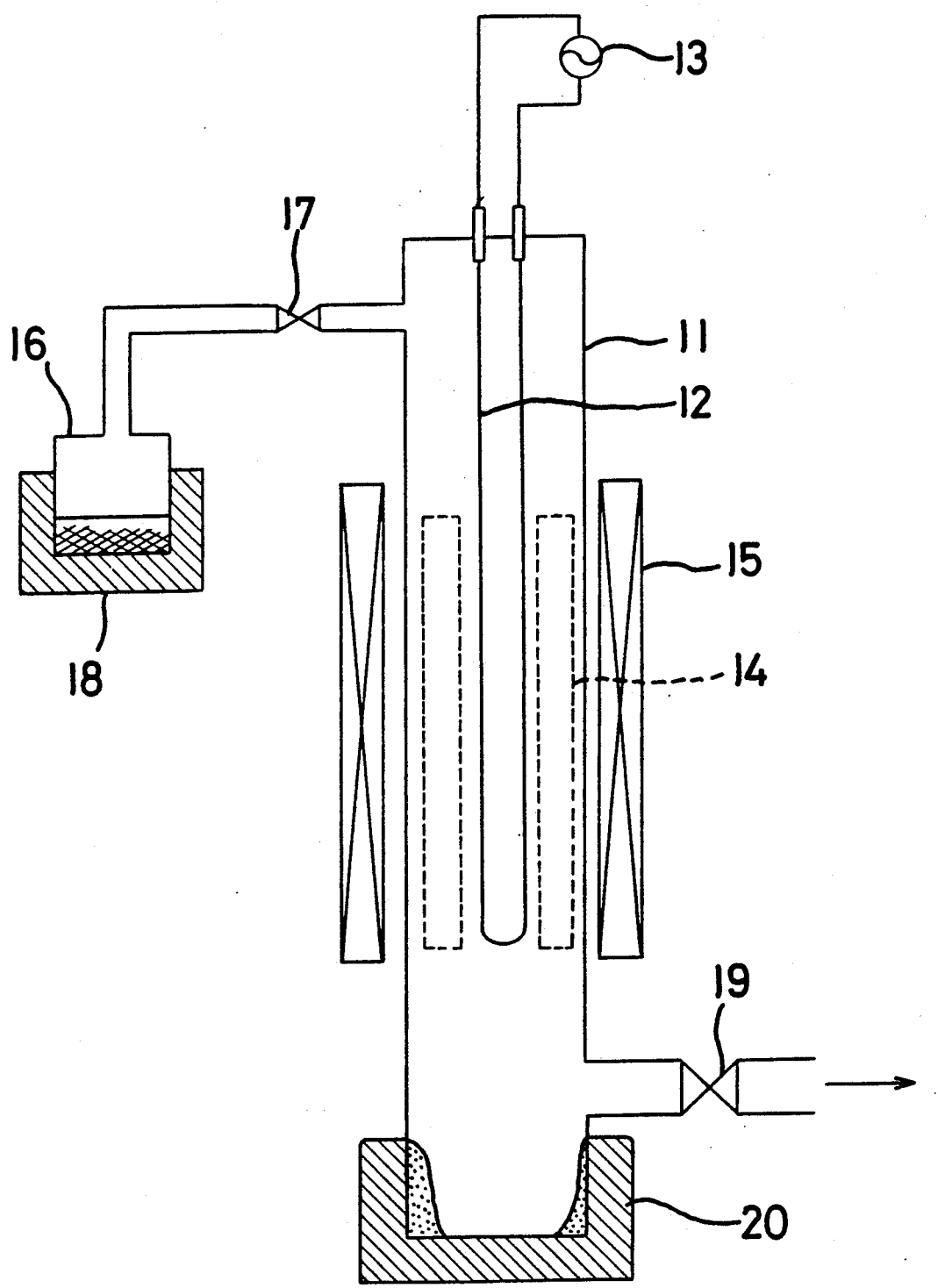
FIG. 1 is a schematic diagram illustrating a method of the present invention.

FIG. 1 presents a schematic representation of a typical embodiment of this invention.

As the reactor 11 is used a cylindrical hermetically sealed container which is vertically held. At the axial center of the reactor 11, there is inserted a filament 12 which is heated by passing current from a source 13. Utilizable as the filament 12 is such a wire of Ti, Ta, Mo or W, for example, in a U-shape as shown in the figure or one formed as a heater by coating a quartz pipe with such a metal as Ta or Mo, for example, which is hard to react with titanium, to make the heating from inside the quartz pipe. Around the filament 12 inside the reactor, there is held crude titanium housed in a holder. The holder is, for example, a 1–5 mm diameter basket made of Mo and provided with a large number of perforations for gas circulation and with a distance of 5–20 mm secured between it and the filament 12.

The reactor 11 is inserted through a cylindrical heating furnace 15 and the heating furnace 15 is placed on the outer-circumferential side of the crude titanium 14 held by a holder inside the reactor 11. To the upper part of the reactor 11, there is connected through a valve 17 a titanium tetraiodide container 16 housing titanium tetraiodide. The titanium tetraiodide container 16 is housed in an electric furnace 18, so that the titanium tetraiodide therein is evaporated and fed into the reactor 11. To the lower part of the reactor 11, there is connected an evacuation discharge system through a valve 19 and the bottom of the reactor 11 is cooled down below the coagulation temperature of titanium tetraiodide by a collector 20, to condense the titanium tetraiodide and the lower valent titanium iodides, thereby collecting them.

When refining high purity titanium from crude titanium, the inside of the reactor 11 is evacuated, while holding crude titanium inside the reactor 11 by means of a holder. Then while heating the inside of the reactor 11 to, for example, 700°–900° C., the filament 12 is heated to, for example, 1,100°–1,300° C. The degree of vacuum inside the reactor 11 is preset to, for example, $10^{-3}$–$10^{-1}$ Torr. Under this state, while feeding titanium tetraiodide vapor into the reactor 11 from the titanium tetraiodide container 16, the evacuation of the inside of the reactor 11 is continued so as to maintain the pressure inside the reactor 11 at $10^{-3}$–$10^{-1}$ Torr.

With this arrangement, the titanium tetraiodide let into the reactor 11 from above reacts with the crude titanium 14 held inside the reactor 11 on the perimeter thereof, thereby synthesizing lower valent titanium iodides (TiI$_2$ and TiI$_3$). The lower valent titanium iodides thus synthesized reach to the axial center of the reactor 11 by gas diffusion, to deposit high purity titanium on the filament 12. The titanium tetraiodide produced by the thermal decomposition again reacts with the crude titanium 14, thereby synthesizing lower valent titanium iodides. Respective gases of titanium tetraiodide and lower valent titanium iodides fall down inside the reactor 11, while repeating these reactions, whereby while the high purity titanium continues being deposited on the filament 12, finally part of the iodides are condensed and collected at the bottom of the reactor 11, with other part discharged out of the reactor 11.

By such a refining method of high purity titanium, the low valent titanium iodides are decomposed into high purity titanium and titanium tetraiodides by thermal decomposition at relatively low temperatures, thereby depositing high purity titanium on the filament 12. Accordingly, the otherwise probable thermal decomposition of impurities contained in the low valent titanium iodides synthesized is averted, thereby deterring the impurities from mingling into the deposited titanium.

Further, in the synthetic reaction of lower valent titanium iodides, the lower valent titanium iodides are directly obtained in gas state; therefore, the lower valent titanium iodides do not coagulate. As for titanium tetraiodide, its evaporation temperature is lower than the evaporation temperature of the lower valent titanium iodides, thus there being no possibility of its condensation at the synthesizing temperature of the lower valent titanium iodides. Accordingly, on the crude titanium surface, its iodizing reaction stably proceeds.

Furthermore, since the impurities in the crude titanium scattered inside the reactor 11 in iodizing crude titanium are successively discharged out of the reactor 11 concomitant with the evacuation of the inside of the reactor 11, there is no possibility that they might be condensed into the iodide gases inside the reactor 11. Because of this effect in addition to that the thermal decomposition of the impurities in the lower valent titanium iodides that would otherwise occur at the time of thermal decomposition of the low valent titanium iodides may be averted, a dramatic quality improvement of deposited titanium may be achieved.

In the refining method of high purity titanium of this invention, the synthetic reaction temperature of the lower valent titanium iodides should preferably be about 700°-900° C. Below 700° C., the lower valent titanium iodides condense, thereby thwarting the reaction, but above 900° C., which is hardly distinguishable from the temperatures of the thermal decomposition range, the deposition rate of titanium declines. Their thermal decomposition reaction temperature should preferably be about 1,100°-1,300° C. Below 1,100° C., deposition of titanium would be hard to take place, but above 1,300° C., metal impurities would thermally decompose; as a result, the purity of the deposited Ti would lower.

The pressure inside the reactor should preferably be about $10^{-1}$-$10^{-3}$ Torr. Below $10^{-3}$ Torr, an adequate deposition rate is not achieved, but over $10^{-1}$ Torr, the deposition rate decreases, with the diffusion of titanium iodides governing the reaction rate.

The feeding of titanium tetraiodide into the reactor and the discharge of titanium iodide out of the reactor may be made intermittently.

The present invention will now be further illustrated by reference to an Example, which is provided solely for the purpose of illustration and is not intended to be limitative.

EXAMPLE

Figure 2:
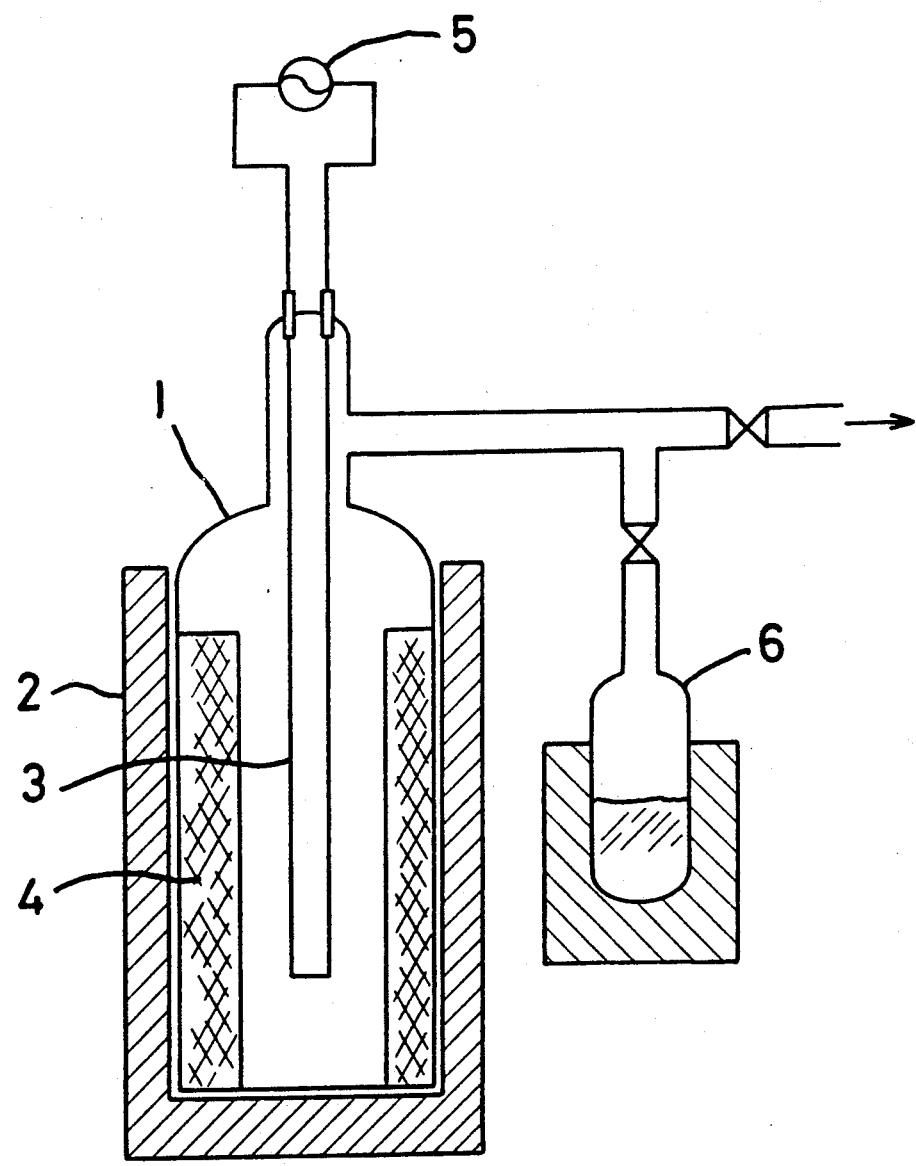
FIG. 2 is a schematic diagram illustrating a conventional method.

High purity titanium was prepared in the manner depicted in FIG. 1 with the reaction temperature for the synthesis of lower valent titanium iodides set at 900° C., thermal decomposition reaction temperature at 1,150° C., feed rate of titanium tetraiodide at 10 g/2 hr, and the pressure inside the reactor at $10^{-2}$ Torr. As a result, the reaction carried on for 30 hr yielded approx. 150 g of refined high purity titanium. For comparison, refinement of high purity titanium by the conventional method as represented by FIG. 2 was made. The amounts of impurities determined by analysis in the refined high purity titanium thus obtained are compared in Table 1 with the amounts of impurities determined by analysis in crude titanium:

TABLE 1

|  |  | (ppm) | | | | | | | |
|---|---|---|---|---|---|---|---|---|---|
|  |  | Fe | Ni | Cr | Al | Si | Cl | O | N |
| Crude titanium | | 30 | 10 | 10 | 10 | 10 | 450 | 400 | 30 |
| Refined titanium | The method of this invention | 1 | 1 | 1 | 2 | 3 | <0.2 | 90 | <10 |
|  | Conventional method | 10 | 3 | 3 | 3 | 3 | 50 | 100 | 10 |

In the operation by the conventional method, a container in which 1 kg of sponge titanium and 30 g of iodine were filled and, after evacuated, was held for 30 hr at a titanium iodides synthesizing temperature set to 300° C. and the thermal decomposition temperature set to 1,500° C. Under these conditions, as compared with the method of the present invention, not only the quality of the refined titanium was inferior, but the synthetic reaction became hard to proceed, because the reaction was thwarted, as it proceeded, resulting in condensing of large amount of lower valent titanium iodides on the crude titanium.

As is clear from the foregoing description, the refining method of high purity titanium of the present invention utilizes lower valent titanium iodides as the gas source to be thermally decomposed, with the result of lowered thermal decomposition temperature, so that thermal decomposition of impurities contained in the gas source to be thermally decomposed may be averted, thereby enabling quality improvement of refined titanium Moreover, because of the high reaction temperature in synthesizing the lower valent titanium iodides, there is no possibility of depositing lower valent titanium iodides and titanium tetraiodide in solid state. Accordingly, there is no fear that crude titanium might be coated by these titanium iodides, thus permitting the refinement of high purity titanium to be stably continued for long.

Further, if the iodide gases inside the reactor are discharged out of the reactor during the reactions, the fear that impurities might be condensed into the iodide gases inside the rector may be precluded, thereby enabling further upgrading the purity of the refined titanium.

Having described the present invention, it will be apparent to one of ordinary skill in the art that many changes and modifications can be made to the above-described embodiments without departing from the spirit and the scope of the present invention.

What is claimed as new and desired to be secured by letters patent of the United States is:

1. A method of refining high purity titanium, which comprises:
   a) reacting crude titanium with titanium tetraiodide in a reactor, thereby forming lower valent titanium iodides, and
   b) thermally decomposing the formed lower valent titanium iodides, and depositing high purity titanium.

2. The method of claim 1, wherein iodide gases are discharged from the reactor, while feeding titanium tetraiodide into the reactor, by evacuating the inside of the reactor, while effecting reaction.

3. The method of claim 1, wherein the reaction temperature of the lower valent titanium iodides is about 700°-900° C.

4. The method of claim 1, wherein the thermal decomposition temperature is about 1,100°-1,300° C.

5. The method of claim 1, wherein the pressure inside the reactor is about $10^{-1}$-$10^{-3}$ Torr.

6. The method of claim 1, wherein the feeding of titanium tetraiodide into the reactor and the discharge of the iodide gases out of the reactor are performed continuously or intermittently.

7. The method of claim 1, wherein said formed lower valent titanium iodides are at least one of $TiI_2$ and $TiI_3$.

8. The method of claim 3, wherein said reaction temperature of the lower valent titanium iodides is about 900° C.

9. The method of claim 4, wherein the thermal decomposition temperature is about 1,150° C.

* * * * *